United States Patent Office 3,304,588
Patented Feb. 21, 1967

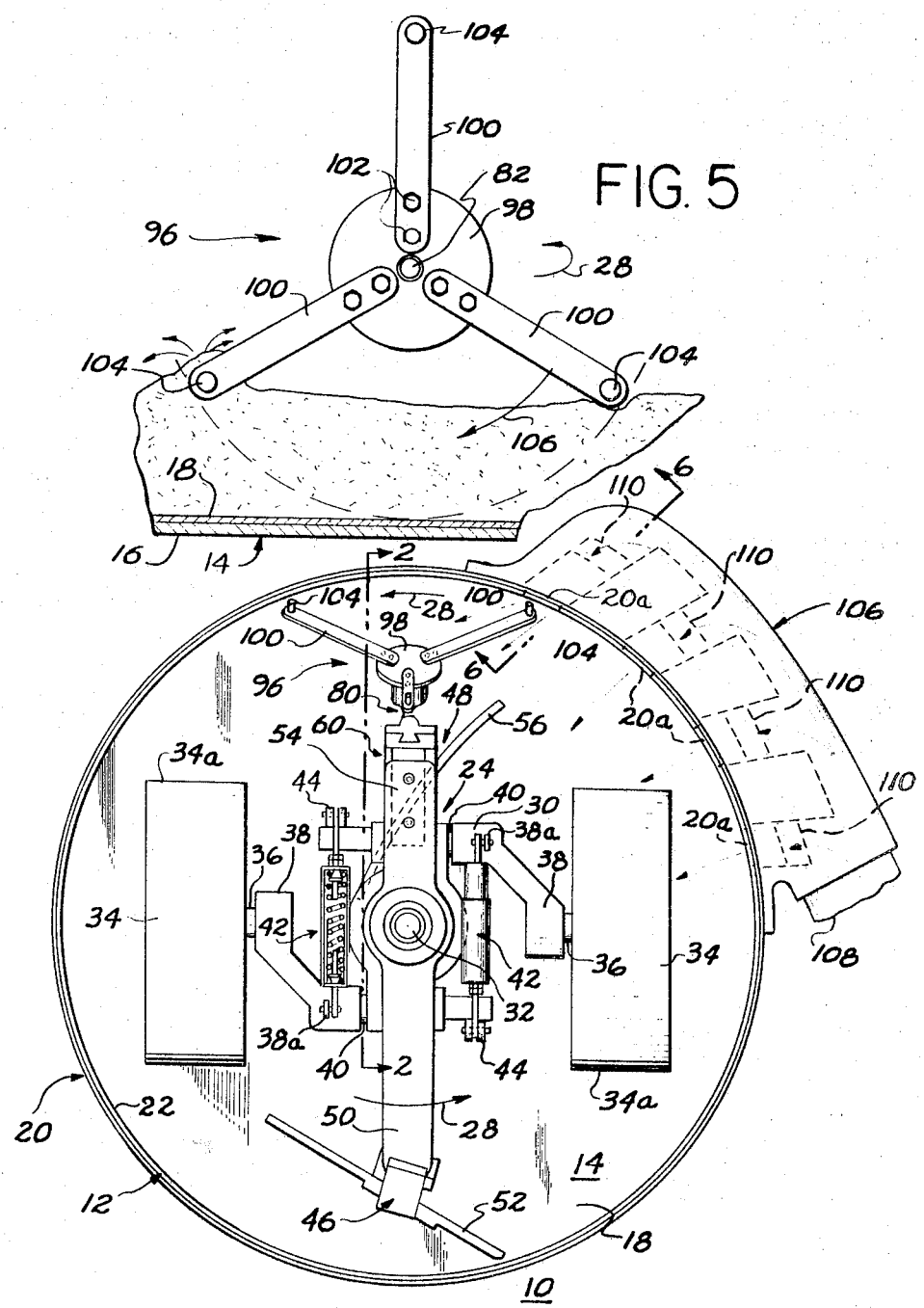
Feb. 21, 1967     R. L. McILVAINE     3,304,588
APPARATUS FOR CONDITIONING GRANULAR MATERIAL USING
ROTATING SPOKES AND AERATING CLEATS
Filed March 18, 1965     2 Sheets-Sheet 1
INVENTOR.
ROBERT L. McILVAINE
BY Mason, Kolehmainen,
Rathburn & Wyss.
ATTORNEYS

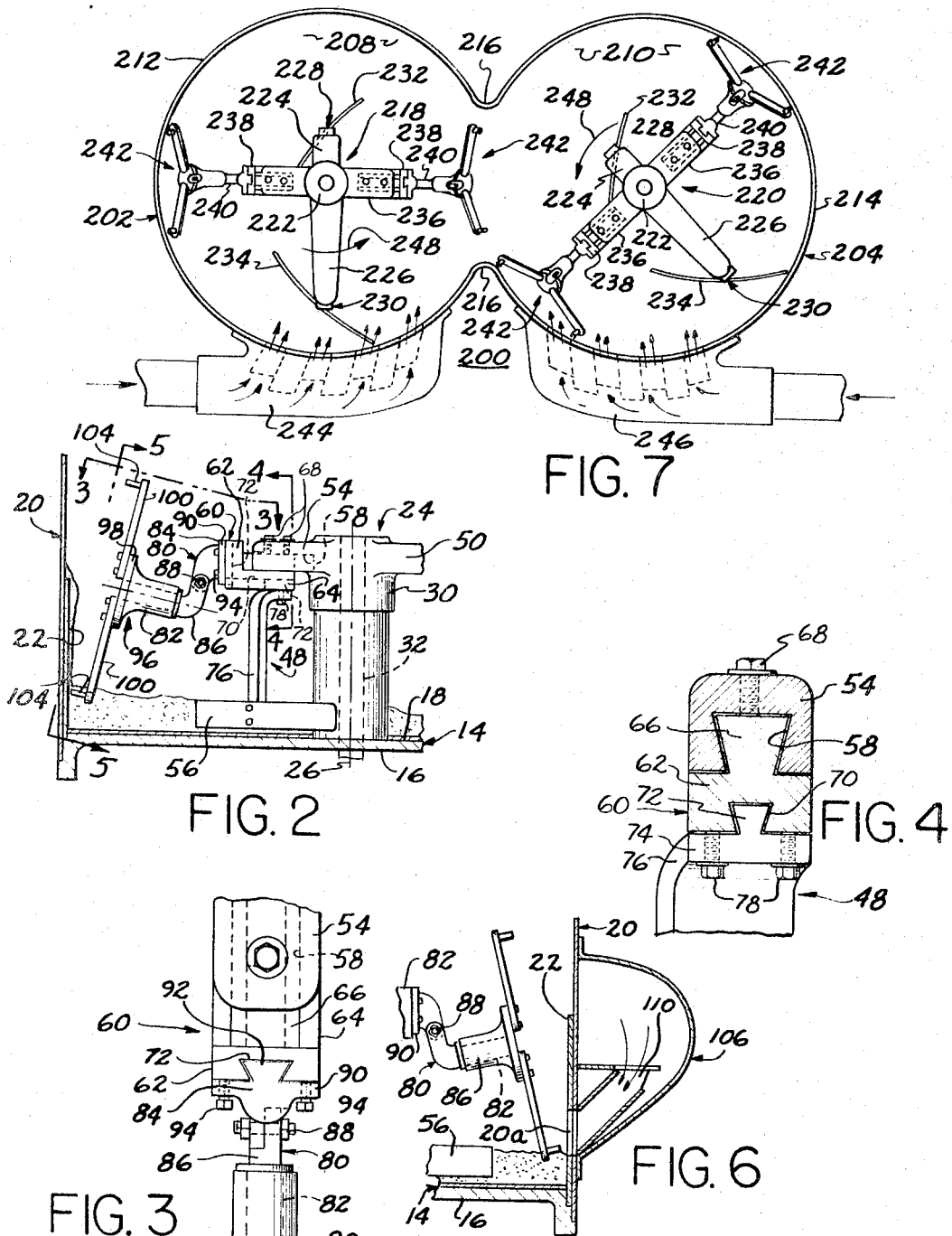

3,304,588
APPARATUS FOR CONDITIONING GRANULAR MATERIAL USING ROTATING SPOKES AND AERATING CLEATS
Robert L. McIlvaine, Winnetka, Ill., assignor, by mesne assignments, to National Engineering Company, Chicago, Ill., a corporation of Delaware
Filed Mar. 18, 1965, Ser. No. 440,744
18 Claims. (Cl. 22—89)

The present invention relates to a new and improved apparatus for conditioning granular materials and the like, and more specifically relates to a new and improved apparatus for mixing, pulverizing, and aerating materials, such as foundry sand and the like, in preparation for use in molding operations.

In foundry operations, after the molding sand has been recovered from mold knockout operations and metal particles have been removed therefrom, it is desirable to recondition the sand for further use in molding operations. Before reconditioning, the molding sand generally contains large lumps and agglomerates which must be broken down and, in addition, the sand contains noxious gases and other chemicals which must be removed therefrom by aeration or the like.

The present invention provides a new and improved apparatus for breaking up lumps or agglomerates in the sand, thoroughly mixing the sand, and aerating the sand to provide the necessary conditioning thereof in order that the sand may then be finally prepared for reuse in further molding operations.

Accordingly, it is an object of the present invention to provide a new and improved apparatus for conditioning granular material and the like.

It is another object of the present invention to provide a new and improved apparatus for conditioning granular material in which the material is pulverized, mixed, and aerated.

Another object of the present invention is to provide a new and improved apparatus of the type described, including means for continuously lifting and aerating the sand as it is being mixed.

More specifically, it is an object of the present invention to provide a new and improved apparatus of the type described, including a mixing head assembly mounted for rotation in a material-containing chamber and including a new and improved aerating structure for penetrating the material and lifting it for aeration as the head assembly rotates around the chamber.

Yet another object of the present invention is the provision of a new and improved aerating structure of the type described, and means for directing a flow of gaseous fluid into the material as it is lifted for further aeration.

Still another object of the present invention is the provision of a new and improved apparatus of the type described including a pair of material-containing chambers in communication with one another and each having a rotary mixing head therein including a new and improved aerating structure, and means associated with the chambers for directing a flow of gaseous fluid into the material as it is lifted by the aerating structure.

Yet another object of the present invention is the provision of a new and improved aerating structure which can be easily mounted on a conventional mixer for aerating the material being mixed.

A yet further object of the present invention is the provision of a new and improved aerating structure of the type described for use with mixers having a material-containing chamber and a mixing head assembly mounted for rotation therein, wherein the aerating structure is mounted on the head assembly and is adjustable relative to the walls of the chamber.

For a better understanding of the present invention, reference should be had to the following detailed description taken in conjunction with the drawings, in which:

FIG. 1 is a top plan view of a mixer for granulated material and the like constructed in accordance with the features of the present invention;

FIG. 2 is a fragmentary sectional view of the mixer of FIG. 1 taken substantially along line 2—2 thereof;

FIG. 3 is a top plan view taken substantially along line 3—3 of FIG. 2;

FIG. 4 is a transverse sectional view taken substantially along line 4—4 of FIG. 2;

FIG. 5 is a side elevational view taken substantially along line 5—5 of FIG. 2;

FIG. 6 is a transverse sectional view taken substantially along line 6—6 of FIG. 1; and FIG. 7 is a top plan view of another embodiment of a mixer for granulated material and the like constructed in accordance with the features of the present invention.

Briefly, in one embodiment illustrated and described, the present invention comprises a mixer having a material-containing mixing chamber formed with a bottom wall and an upstanding sidewall, and a mixing head assembly mounted in the chamber for rotation about a central axis. The head assembly includes shaft means extending outwardly toward the sidewall of the chamber and spaced above the bottom wall thereof. A material aerating structure is mounted for free rotation on the shaft means and includes spokes extending outwardly of the shaft means to support a plurality of aerating cleats which engage the material as the head assembly rotates around the chamber. The cleats are disposed to extend outwardly toward the sidewall of the mixing chamber, and the outer ends thereof move in close proximity to the sidewall to prevent material from building up or collecting thereon. As the mixing head rotates around the mixing chamber, the cleats engage the material therein, causing the aerating structure to rotate on the supporting shaft means and accordingly the cleats move on a circular path about the shaft means downwardly into the material and upwardly therefrom to lift and aerate the material. Means are provided for directing a high-velocity airflow inwardly into the material in the chamber from a plurality of spaced locations along the sidewall to further aerate the material being lifted by the rotating aerating structure.

Referring now, more specifically, to the drawings, therein is illustrated in FIGS. 1 through 6 one embodiment of a mixer 10 adapted for conditioning granular material and constructed in accordance with the features of the present invention.

The mixer 10 includes a mixing chamber 12 for containing a quantity of granular material, such as foundry sand and the like, to be conditioned. The chamber 12 is formed with a bottom wall 14 including a lower supporting bedplate structure 16 and an upper, removable wear plate or liner 18 supported thereon. The chamber includes an upstanding, cylindrical sidewall 20 supported around its lower periphery on the bedplate structure 16 and having a removable wall liner 22 extending partway up the wall 20, as shown in FIGS. 2 and 6.

A mixing head assembly 24 is mounted in the chamber 12 for rotation about a central axis 26 (FIG. 2) in a fixed direction of rotation as shown by an arrow 28 of FIG. 1. The head assembly includes a turrethead 30 which is mounted on and supported by a central drive shaft 32 which extends downwardly through the bottom wall 14 and is drivingly connected with a drive unit (not shown) positioned below the mixing chamber.

In order to pulverize and break up lumps in the material as the head assembly rotates around the mixing chamber, the assembly includes a pair of large, heavy mulling wheels 34 journaled for free rotation on axles 36 which extend outwardly from respective wheel support members 38. The wheel support members are mounted for pivotal movement on a pair of outwardly extending axles 40 which are mounted on opposite sides of the turrethead 30.

As the head assembly is rotated in the mixing chamber, the outer peripheral mulling surfaces 34a of the mulling wheels 34 engage the material in the chamber, forcing the material against the wear plate 18 to crush or break up large lumps or granules therein. The wheels are journaled for free rotation on the axles 36 and are rotated by frictional engagement with the material as they travel around the chamber during rotation of the head assembly 24 about the central axis 26. In addition, the wheels 34 are movable toward and away from the wear plate because of the pivotal mounting of the wheel support members 38 on the axles 40 of the head assembly and, accordingly, the wheels may float or ride upwardly on the bed of material in the mixing chamber.

Each of the wheel support members 38 includes an upstanding bias arm 38a connected to one end of each one of a pair of tension spring biasing assemblies 42. The other ends of the biasing assemblies 42 are connected to respective fixed arm assemblies 44 which are mounted on opposite sides of the turrethead 30 to extend upwardly. The biasing assemblies 42 are preferably of the type described in the copending U.S. patent application Serial No. 328,904, filed December 9, 1963, assigned to the same assignee as the present invention, and are adjustable to provide selected biasing forces for urging the mulling wheels 34 downwardly toward the wear plate 18. It can be seen from FIG. 1 that the mulling wheels 34 traverse a relatively wide concentric path around the mixing chamber as the head assembly rotates and, consequently, the material in the chamber within the path of the wheels is thoroughly pulverized. By proper adjustment of the biasing assemblies 42 and by selecting wheels of the desired weight and size, the mulling pressure on the material can be maintained as desired for a wide variety of different materials.

In order to thoroughly mix the material in the chamber 12 and continuously move the material into the path of the mulling wheels 34 for pulverization, the head assembly includes an outer plow assembly 46 and an inner plow assembly 48. The outer plow assembly 46 is supported on an elongated support arm 50 of the turrethead 30 and includes an outer plow or scraper 52 having its lower edge in close proximity to the wear plate 18 and an outer edge disposed to move in close proximity to the wall liner 22 on the sidewall. The outer plow extends inwardly from the periphery of the mixing chamber as illustrated in FIG. 1, and is positioned relative to the turrethead and the direction of rotation of the head assembly in a manner whereby material around the periphery of the mixing chamber is moved inwardly by the plow into the path of the mulling wheels 34 as the head assembly rotates.

The inner plow assembly 48 is supported from a relatively short support arm 54 extending outwardly of the turrethead in a direction opposite the support arm 50 and includes an inner plow or scraper 56 having its lower edge in close proximity to the wear plate 18. The inner plow extends outwardly from the central portion of the mixer and is positioned as shown in FIG. 1 relative to the turrethead and the direction of rotation of the head assembly in a manner whereby material adjacent the central portion of the chamber is moved outwardly into the path of the mulling wheel as the head assembly rotates.

Referring to FIGS. 2, 3, and 4, the support arm 54 is formed with a horizontally and radially outwardly extending slot or slideway 58 on the underside thereof, and the slot is formed with an inverted trapezoidal-shaped cross section, as shown in FIG. 4. An L-shaped bracket 60 having an upstanding outer leg 62 and a horizontally extending leg 64 is supported by the arm 54. The horizontal leg 64 is formed with a tongue or key 66 on the upper portion thereof having a trapezoidal cross section similar to that of the guideway or slot 58, and the key is slidable horizontally within the slot between selectively adjustable positions. A pair of threaded setscrews 68 are provided in the arm 54 for engagement with the top of the key 66 to secure the support bracket 60 in a selected position on the arm.

The horizontal leg 64 of the L-shaped bracket is formed with a guideway or slot 70 on its underside, also of inverted trapezoidal cross section, in order to slidably accommodate a tongue or key 72 formed on the upper surface of a horizontally extending upper leg portion 74 of an inner plow mounting arm 76. The plow mounting arm 76 carries the inner plow 56 on its lower end and is horizontally slidable relative to the L-shaped bracket 60, which in turn is horizontally slidable relative to the support arm 54 as just described. A pair of upwardly extending setscrews 78 are provided on the leg 74 of the plow mounting arm 76 and the upper ends of the setscrews engage the underside of the horizontal leg 64 of the L-shaped bracket 60 in order to secure the plow mounting arm in a selected position. From the foregoing description, it is seen that the radial position of the inner plow 56, with respect to the turrethead 30, can be adjusted in order to provide optimum positioning of the plow 56 for moving material outwardly into the path of the mulling wheels 34, and the upstanding leg 62 of the L-shaped bracket can be positioned at selected outward radial positions with respect to the turrethead.

The upstanding leg 62 of the L-shaped bracket 60 is provided with a vertically extending guideway or slot 72 which extends inwardly from the outer vertical face of the leg, and this slot is formed with a trapezoidal-shaped cross section, as shown in FIG. 3. The leg 62 supports the upper end of a shaft support structure 80 which carries an outwardly extending shaft or axle 82. The shaft support structure 80 includes an upper member 84 and a lower member 86 which are secured together by means of a horizontally extending pivot bolt 88. The upper member 84 includes an upper end portion 90 having a flat face which abuts the outer face of the upstanding leg 62 of the L-shaped bracket. The portion 90 is formed with a vertical key or tongue 92 (FIG. 3) which is slidable within the guide slot 72 of the leg 62, and a plurality of setscrews 94 are provided on the portion 90 to engage the outer face of the leg 62 holding the structure 80 in selected vertical position relative to the L-shaped bracket 60. The pivot bolt 88 permits the upper member 84 and the lower member 86 to be pivotally adjusted relative to one another to change the angle between the shaft 82 and the bottom or wear plate 18 of the mixing chamber. As illustrated in FIG. 2, the axis of the shaft 82 slopes upwardly away from the wear plate towards the outer portion of the mixing chamber, and the angle of slope can be selectively adjusted by means of the pivotal connection between the members 84 and 86 and, once adjustment is made, the pivot bolt 88 is tightened to hold the members 84 and 86 tightly together at the desired angular relation with respect to one another.

In accordance with the present invention, a material aerating structure 96 is journaled for free rotation on the upwardly sloping shaft 82. The aerating structure includes a central hub 98 and a plurality of radially extending, replaceable spokes 100 which are fastened to the hub by cap screws 102. Adjacent the end of each spoke, there is provided an aerating cleat 104 which extends outwardly therefrom toward the inner surface of wall liner 22 of the mixing chamber.

As the head assembly 24 rotates around the mixing chamber 12, the aerating cleats 104 engage the material, causing the aerating structure to rotate on the axle 82 in a circular direction indicated by the arrow 106 in FIG. 5. The cleats 104 travel in a circular path relative to the axle 82 and move downwardly to penetrate the material and then move upwardly, each carrying and entraining a small portion of the material upwardly therewith. The material carried upwardly with the cleats eventually falls downwardly back into the mass of material in the chamber and is thoroughly aerated by the surrounding air as it falls. The cleats are spaced in relation to each other and to the upper level of material in the mixing chamber so that as one cleat is moving upwardly from the surface of the material, the next succeeding cleat of the structure is in engagement with the material at or below the upper surface thereof. In this manner, continuous rotation of the aerating structure 96 about the shaft 82 is assured whenever the mixing head assembly 24 is rotating in the mixing chamber. Aeration of the material in the mixing chamber is accomplished not only by the lifting action of the cleats, but also by penetration and movement of the cleats within the material below the upper surface thereof. The latter action thoroughly mixes the material around the periphery of the mixing chamber and, while doing so, entrains considerable amounts of air within the material around the particles thereof.

The amount of downward penetration into the material by the moving cleats 104 can be adjusted by adjusting the position of the support structure 80 on the upstanding leg 62 of the L-shaped bracket 60 and also by adjusting the angle of the upslope of the shaft 82 relative to the wear plate 18. The outer ends of the cleats 104 are disposed to travel in close proximity to the wall liner 22 of the mixing chamber and the clearance between the outer ends of the moving cleats and the wall liner can be adjusted as desired by selecting the position of the L-shaped bracket on the arm 54. Additionally, the clearance between the end of the cleats 104 and the wall liner 22 is effected by the upslope angle of the shaft 82. Because of the upslope of the shaft 82, the circular path traversed by the ends of the cleats around the shaft is slanted in relation to the sidewall of the mixing chamber as illustrated in FIG. 2. Accordingly, the cleats 104, when traversing the lower portion of the circular path about the shaft 82, are closer to the wall liner 22 than when they are traversing the upper portion of the circular path. As each cleat reaches the lowest point of travel on its path about the shaft 82, minimum clearance distance from the wall liner 22 is provided and, because the cleats move in such close proximity to the wall liner during the rotation of the serrating structure, any appreciable material buildup on the wall liner is removed and the liner is continually being cleaned by the action of the cleats.

In order to further aerate the material in the mixing chamber and to provide for heating or cooling thereof if desired, a plenum chamber or manifold 106 is secured to extend along a portion of the outer surface of the sidewall 20 of the mixing chamber. The manifold includes an inlet 108 at one end for connection to a source of pressurized fluid, such as a high pressure fan or blower (not shown). Preferably, the manifold 106 is of the type shown and described in detail in copending U.S. patent application Serial No. 416,566, filed December 7, 1964, which application is assigned to the same assignee as the present invention, and reference should be had to this application. Within the manifold there are provided a plurality of downwardly extending air scoops 110 having open upper ends in communication with the interior of the manifold. The lower ends of the air scoops are in communication with a plurality of spaced ports 20a provided in the sidewall 20 of the mixing chamber. The ports 20a are disposed along the sidewall of the mixing chamber at a level adjacent the lower portions of the circular paths traversed by the outer ends of the cleats 104 of the aerating structure. As illustrated in FIG. 6, the lower edges of the ports 20a are disposed along a line approximately level with the upper surface of the material in the mixing chamber and are approximately on the same level as the upper edges of the plows 52 and 56.

Pressurized fluid flowing into the manifold 106 from the inlet 108 thereof is directed downwardly by the air scoops 110 through the ports 20a and from the ports directly into the material along the periphery of the mixing chamber at substantial velocities in the range of 6000 to 10000 f.p.m. The high-velocity streams further aerate the material as it is being moved about by the aerating structure 96, and the combination of the high-velocity fluid flow from the ports and the mechanical aeration of the material by the moving cleats 104 provides for extremely effective aerating action and thorough mixing of the material. The material being lifted by the cleats and falling or sifting downwardly therefrom as it moves upwardly is subjected to high-velocity fluid streams from the ports 20a and is further aerated thereby to aid in removing moisture and noxious fumes or gases. The aerating structure 96, with its cleats 104 and spokes 100 moving in close proximity to the ports 22a, does not appreciably obstruct the flow of high-velocity fluid emanating from the ports because the cleats and spokes present only a small area in direct confrontation with the high-velocity fluid streams. The aerating structure 96 prevents material from building up around the sidewall of the mixer chamber and, in addition, aids in preventing the ports 20a from becoming plugged with material by agitation of the material immediately adjacent the ports.

Referring now to FIG. 7, therein is illustrated another embodiment of a mixer 200 which is constructed in accordance with the present invention. The mixer 200 includes a pair of mixing chambers 202 and 204 arranged in side-by-side relation with each other and in communication with each other through an enlarged common opening 206. The mixing chambers include bottom walls 208 and 210, respectively, which are on a common level and which, together, form a common floor having the approximate shape of a figure eight when viewed from the top, as illustrated in the drawing. The chambers also include upstanding sidewalls 212 and 214, respectively, which are generally cylindrical and are joined together as at 216, which junctions define opposite sides of the common opening 206 between the chambers.

A pair of mixing head assemblies 218 and 220 are centrally mounted for rotation in each of the respective mixing chambers 212 and 214. The mixing head assemblies 218 and 220 are preferably identical and are somewhat similar to the head assembly 24 previously described. Each head assembly includes a central turret-head 222 having a pair of diametrically opposite, outwardly extending plow support arms 224 and 226, respectively. The support arms 224 carry inner plow assemblies 228, and the support arms 226 carry outer plow assemblies 230. The plow assemblies are generally similar to those previously described and include outwardly extending inner plows 232 and inwardly extending outer plows 234, respectively. In place of mulling wheels and their associated supporting members, each of the head assemblies 218 and 220 is provided with a pair of diametrically opposite, outwardly extending arms 236 which extend generally normal to the plow-supporting arms 224 and 226. The arms 236 are similar in construction to the support arm 54 of the mixer 10 and provide support for L-shaped brackets 238 similar to the bracket 60 previously described. Each bracket 238 provides support for a shaft support member 240 similar to the member 80, and a rotating aerating structure 242, similar to the structure 96, is journaled on the shaft carried by each support member 240. A pair of pressure fluid manifolds 244 and 246, similar to the manifold 106, are mounted on the respective sidewalls 212 and 214 of the mixing chambers. Ports are provided in the sidewalls to direct high-velocity fluid streams inwardly into the material in the chambers in the manner previously described in connection with the manifold 106.

The mixer 200 is adapted for use in preconditioning material before it is delivered to a final mulling stage. Thorough mixing and aeration are accomplished by the plows and the aerating structures 242 in a manner similar to that described in connection with the previous embodiment. The head assemblies 218 and 220 rotate in the same direction about their central axes as indicated by the arrows 248, and are synchronized in respect to one another so that the outer plow of one head assembly passes the common opening 206 just prior to an aerating structure 242 on the other head assembly in the adjacent chamber. Sand is introduced into one of the mixing chambers and is passed to the other chamber for further mixing and aeration for ultimate discharge therefrom. As an example, sand introduced into the chamber 212 is moved by the plows and aerating structures in a counterclockwise direction until it passes into the common opening 206 between the chambers. The plows and aerating structures associated with head assembly 220 pick up the sand from the first chamber 212 and move it generally in a counterclockwise direction around the chamber 214 until it is discharged. The transfer of material between chambers is similar generally to that described in U.S. Patent Re. 25,475, dated November 5, 1963, which patent is assigned to the same assignee as the present invention. The mixer 200 provides multistage operations of both mixing and aeration of the material and, consequently, a greater amount of mixing and aeration is accomplished in the same time interval. Because there are no mulling wheels associated with the mixing heads 218 and 220, the heads can be driven at a higher r.p.m. with a further increase in the mixing and aeration of the material. Additionally, each mixing head carries a pair of aerating structures 242 instead of one, also resulting in better aeration and agitation of the material. It can be seen from FIG. 7 that the paths traversed by the outer plow and aerating structures of one head assembly overlap into the other chamber, thus insuring a positive transfer of material from one to the other.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. Apparatus for conditioning granular material and the like comprising a mixing chamber having a bottom wall and an upstanding sidewall, a mixing head assembly mounted in said chamber for rotation about a central axis, said head assembly including shaft means extending outwardly from said central axis and spaced above said bottom wall, and a material aerating structure journaled for rotation on said shaft means, said structure including spokes extending outwardly from said shaft means and a plurality of aerating cleats carried by said spokes adjacent the outer ends thereof, said cleats disposed to extend outwardly toward said sidewall and movable around said shaft means into the material in said chamber toward and away from said bottom wall to lift and aerate the material as said head assembly rotates, said cleats having outer ends disposed to move in close proximity to said sidewall to prevent material buildup thereon.

2. Apparatus as defined in claim 1 wherein said shaft means slopes upwardly away from the bottom wall of said chamber in a direction outwardly from the center thereof whereby the outer ends of said cleats move in a circular path having a lowest point thereon closer to said sidewall than the highest portion of said path.

3. Apparatus as defined in claim 1 including mounting means for adjusting the position of said aerating structure on said head assembly to provide a selectable clearance between the outer ends of said cleats and the sidewall of said chamber.

4. Apparatus as defined in claim 1 wherein said mounting means is adjustable to provide a selectable clearance between said cleats and the bottom wall of said chamber.

5. Apparatus as defined in claim 2 including means for selectively adjusting the angle of slope between said shaft means and said bottom wall.

6. Apparatus as defined in claim 1 including a pair of mulling wheels movable with said head assembly and disposed on opposite sides thereof for independent rotation about their respective mounting axes.

7. Apparatus for conditioning granular material and the like comprising a mixing chamber having a bottom wall and an upstanding sidewall, a mixing head assembly mounted in said chamber for rotation about a central axis, said head assembly including shaft means extending outwardly from said central axis and spaced above said bottom wall, and a material aerating structure journaled for rotation on said shaft means, said structure including spokes extending outwardly from said shaft means and a plurality of aerating cleats carried by said spokes adjacent the outer ends thereof, said cleats disposed to extend outwardly toward said sidewall and movable around said shaft means into the material in said chamber toward and away from said bottom wall to lift and aerate the material as said head assembly rotates, said cleats having outer ends disposed to move in close proximity to said sidewall to prevent material buildup thereon, said head assembly including a plow assembly having an inner plow blade positioned inwardly of said aerating structure adjacent a central portion of said chamber, said inner plow blade having a lower edge adjacent said bottom wall and disposed to extend outwardly of said central axis to move material outwardly thereof on rotation of said head assembly 8. Apparatus as defined in claim 7 including an outer plow assembly having an outer plow blade positioned on an opposite side of said head assembly from said aerating structure, said outer plow blade having a lower edge adjacent said bottom wall and disposed to extend inwardly of said sidewall to move said material inwardly thereof on rotation of said head assembly.

9. Apparatus as defined in claim 7 including a pair of mulling wheels movable with said head assembly and disposed on opposite sides thereof for independent rotation about their respective mounting axes.

10. Apparatus as defined in claim 8 including a pair of mulling wheels movable with said head assembly and disposed on opposite sides thereof for independent rotation about their respective mounting axes.

11. Apparatus for conditioning granular material and the like comprising a mixing chamber having a bottom wall and an upstanding sidewall, a mixing head assembly mounted in said chamber for rotation about a central axis, said head assembly including shaft means extending outwardly from said central axis and spaced above and sloping upwardly from said bottom wall, and a material aerating structure journaled for rotation on said shaft means, said structure including spokes extending radially outwardly from said shaft means and a plurality of aerating cleats carried by said spokes adjacent the outer ends thereof and extending perpendicularly thereto, said cleats disposed to extend outwardly toward said sidewall and movable in a circular path around said shaft means, said path extending into the material in said chamber providing for movement of said cleats toward and away from said bottom wall to lift and aerate the material as said head assembly rotates, said cleats having outer ends disposed to move in close proximity to said sidewall when moving along the lower portion of said path to prevent material buildup thereon and moving inwardly away from said sidewall while traversing an upper portion of said path.

12. Apparatus for conditioning granular material and the like comprising a mixing chamber having a bottom wall and an upstanding sidewall, a mixing head assembly mounted in said chamber for rotation about a central axis, said head assembly including shaft means extending outwardly from said central axis and spaced above said bottom wall, a material aerating structure journaled for rotation on said shaft means, said structure including spokes extending outwardly from said shaft means and a plurality of aerating cleats carried by said spokes adjacent the outer ends thereof, said cleats disposed to extend outwardly toward said sidewall and movable around said shaft means into the material in said chamber toward and away from said bottom wall to lift and aerate the material as said head assembly rotates, said cleats having outer ends disposed to move in a circular path about said shaft means in close proximity to said sidewall to prevent material buildup thereon, and means for directing a high-velocity gaseous fluid flow inwardly into the material in said mixing chamber from a plurality of spaced locations along said sidewall to further aerate the material lifted by said aerating structure.

13. Apparatus as defined in claim 12 wherein said locations are disposed at a level adjacent a lower portion of circular paths traveled by the ends of said cleats.

14. Apparatus as defined in claim 12 wherein the last mentioned means includes a plurality of spaced ports defined in said sidewall along a level adjacent the upper level of the material in said chamber.

15. Apparatus for conditioning granular material and the like comprising a pair of mixing chambers arranged in side-by-side relation and having a common opening therebetween, each of said chambers having a bottom wall and an upstanding sidewall, a mixing head assembly mounted in each of said chambers for rotation about a central axis thereof, said head assemblies each including shaft means extending outwardly from the respective central axis thereof and spaced above said bottom wall, means for rotating said head assemblies in selected synchronous relation with each other, a material aerating structure journaled for rotation on each of said shaft means, each of said structures including spokes extending outwardly from said shaft means and a plurality of aerating cleats carried by said spokes adjacent the outer ends thereof, said cleats of each structure disposed to extend outwardly towards the sidewall of a respective chamber and movable around the shaft means thereof into the material in said chamber toward and away from said bottom wall to lift and aerate the material as said head assembly rotates, said cleats having outer ends disposed to move in close proximity to said sidewall to prevent material buildup thereon.

16. Apparatus as defined in claim 15 wherein each of said head assemblies includes a pair of plow assemblies disposed on opposite sides of the central axis thereof, each of said plow assemblies including a scraper blade positioned to move in close proximity to the bottom wall of a respective chamber, an outer blade of each plow assembly having an outer edge disposed to move in close proximity to the sidewall of a respective chamber and extending inwardly thereof to move material inwardly as the respective head assembly rotates, and an inner blade of each plow assembly disposed adjacent the central portion of its respective chamber and arranged to move material outwardly as its respective head assembly rotates.

17. Apparatus as defined in claim 16 wherein the head assemblies are rotated in opposite directions and are synchronized so that the inner scraper blade of one head assembly passes adjacent said common opening between the chambers in sequence just prior to the outer scraper blade of the other head assembly passing said opening.

18. Apparatus as defined in claim 16 including means for directing a high-velocity gaseous fluid flow inwardly into the material in each of said chambers from a plurality of spaced locations along the respective sidewalls thereof to further aerate the material being lifted by said aerating structure.

References Cited by the Examiner

UNITED STATES PATENTS

| Re. 25,475 | 11/1963 | McIlvaine et al. | 22—89 |
| 3,248,761 | 5/1966 | McIlvaine | 22—89 |

FOREIGN PATENTS

| 399,195 | 7/1924 | Germany. |
| 587,121 | 11/1933 | Germany. |
| 491,455 | 3/1954 | Italy. |

J. SPENCER OVERHOLSER, *Primary Examiner.*

R. D. BALDWIN, *Assistant Examiner.*